N. B. CREGIER.
VAULT AND SAFE CONSTRUCTION.
APPLICATION FILED JAN. 13, 1913.

1,180,246.

Patented Apr. 18, 1916.
4 SHEETS—SHEET 2.

Inventor,
by Nathaniel B. Cregier,
Hazard & Krause
Attorneys.

Witnesses,

N. B. CREGIER.
VAULT AND SAFE CONSTRUCTION.
APPLICATION FILED JAN. 13, 1913.
1,180,246. Patented Apr. 18, 1916.
4 SHEETS—SHEET 3.
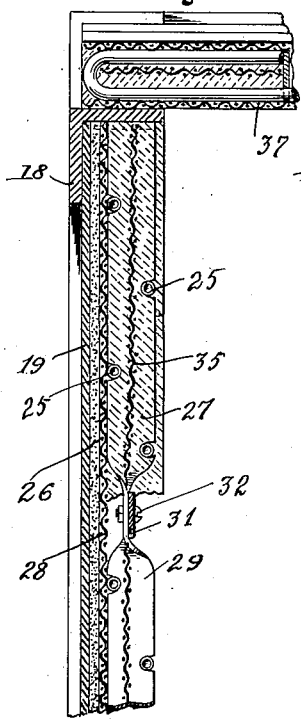
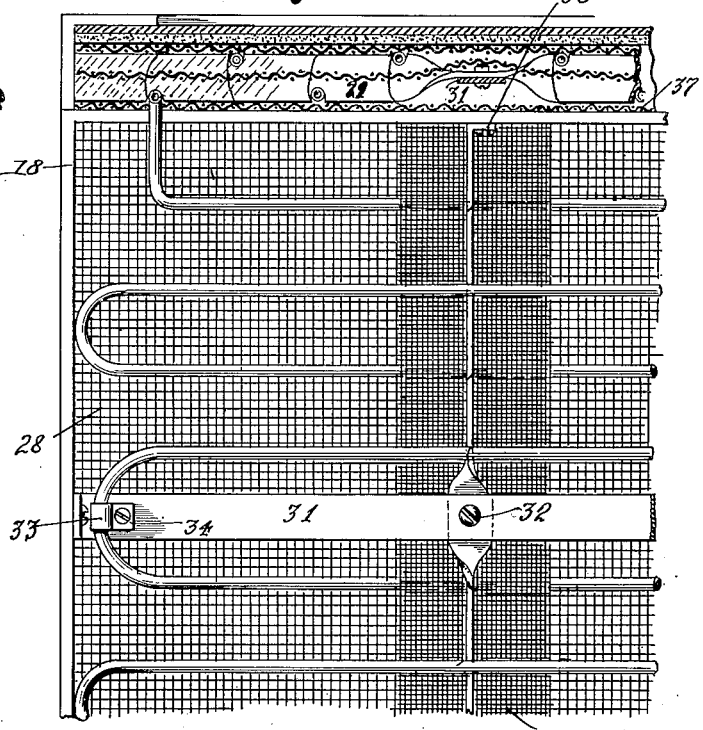
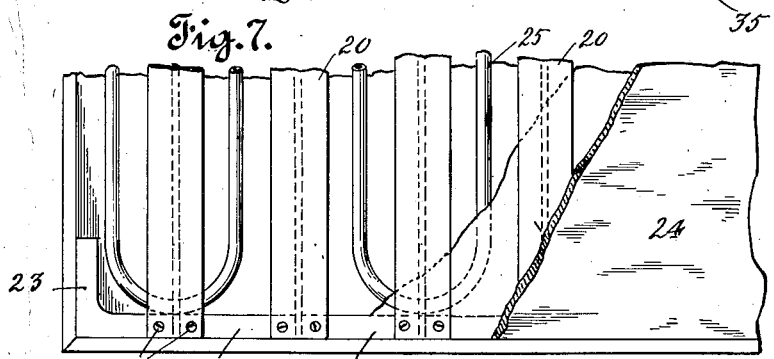
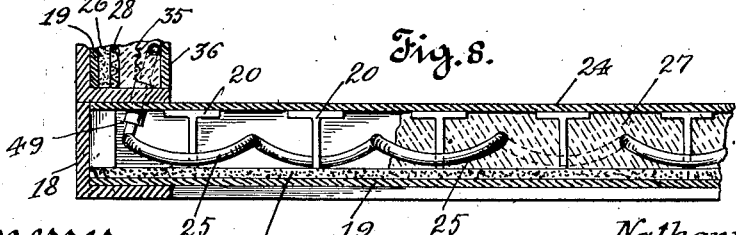
Inventor,
by Nathaniel B. Cregier,
Witnesses,
Attorneys.

N. B. CREGIER.
VAULT AND SAFE CONSTRUCTION.
APPLICATION FILED JAN. 13, 1913.

1,180,246.

Patented Apr. 18, 1916.
4 SHEETS—SHEET 4.

Witnesses.

Inventor.
Nathaniel B. Cregier
by Hazard & Strause
Attys.

UNITED STATES PATENT OFFICE.

NATHANIEL B. CREGIER, OF LOS ANGELES, CALIFORNIA, ASSIGNOR TO VAULT PROTECTION COMPANY, OF LOS ANGELES, CALIFORNIA, A CORPORATION OF CALIFORNIA.

VAULT AND SAFE CONSTRUCTION.

1,180,246.  Specification of Letters Patent.  Patented Apr. 18, 1916.

Application filed January 13, 1913. Serial No. 741,748.

*To all whom it may concern:*

Be it known that I, NATHANIEL B. CREGIER, a citizen of the United States, residing at Los Angeles, in the county of Los Angeles and State of California, have invented a new and useful Improvement in Vault and Safe Constructions, of which the following is a specification.

This invention relates to vault and safe constructions, and the principal object is to provide protective means for a vault or safe or other building construction to be protected, by the introduction in the walls thereof of a vacuum system combined with control and gong stations located at desired points outside or away from the construction protected, the communications between the vault and the various stations being also protected in like manner.

It is also an object to provide means to segregate one or the other of these several circuits, together with means for automatically preventing the opening of the protected doors intermediate of set times.

It is a further object to provide means in conjunction with the automatic closing means by which the system may be tested, and time allowed for closing the control box door, together with means for periodically testing the system without interrupting the operation of the latter to test its efficiency.

Figure 1:
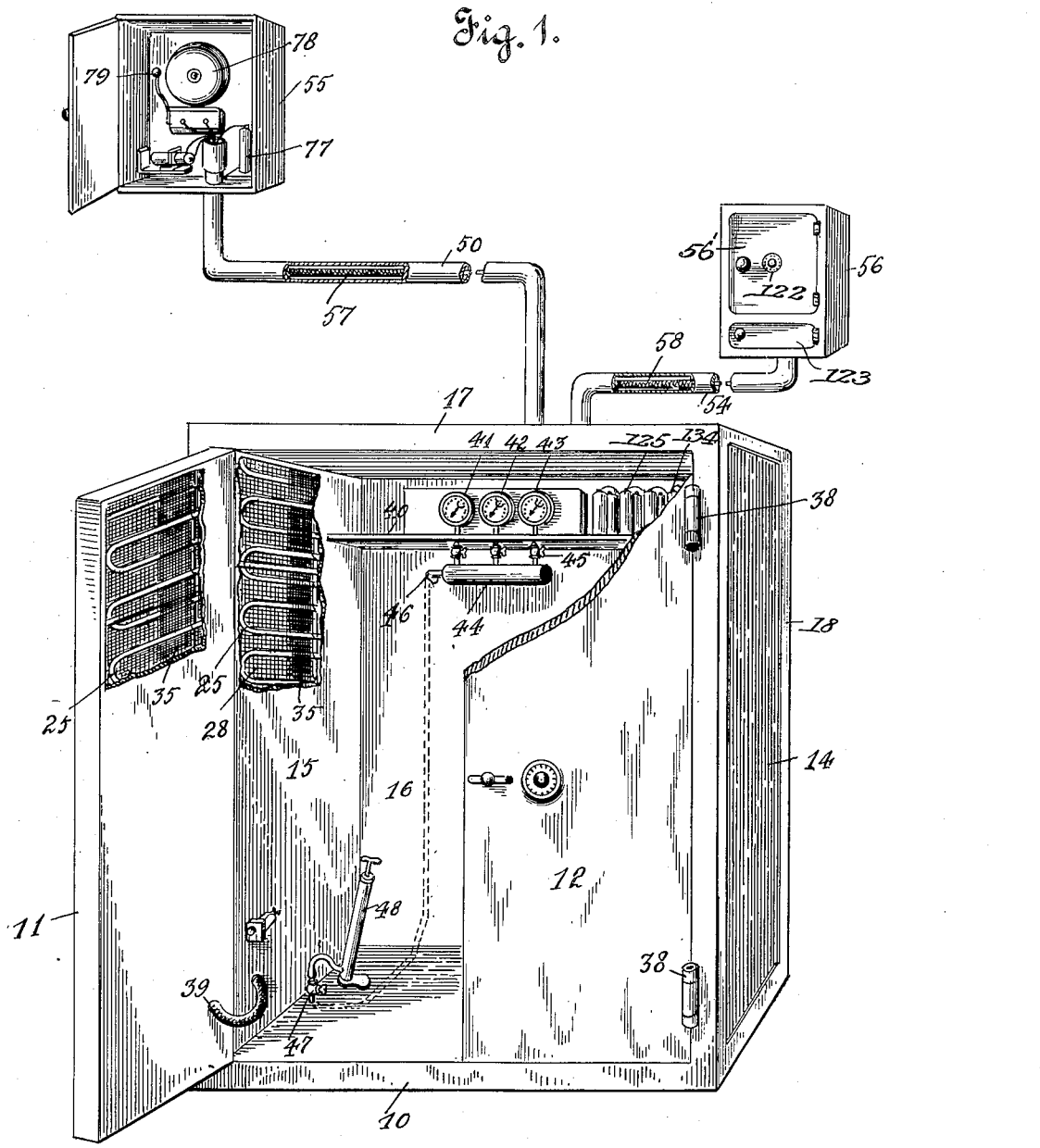
Figure 2:
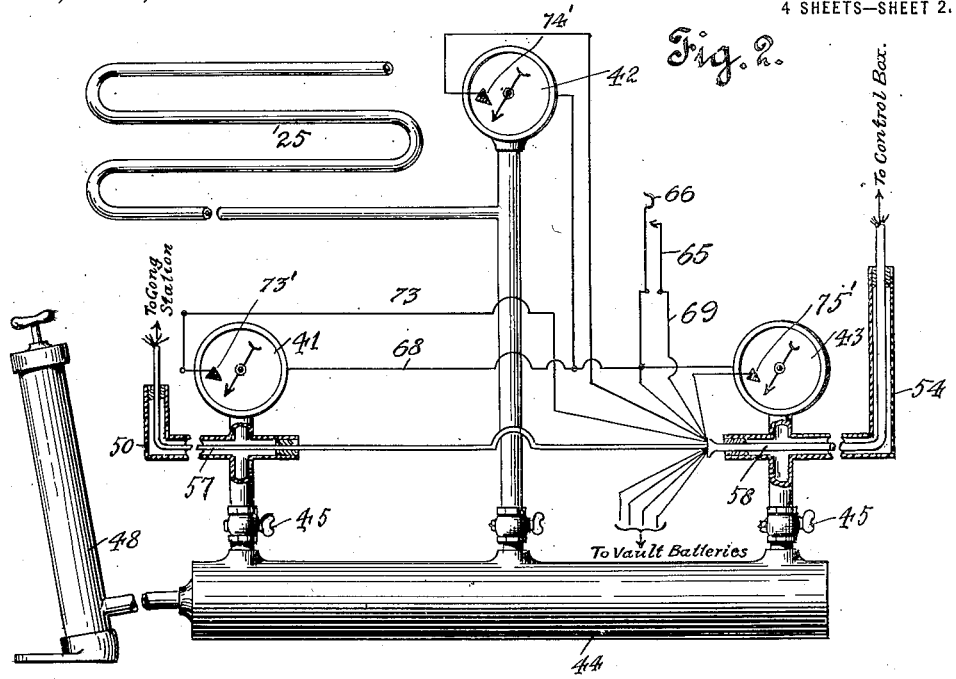
Figure 3:
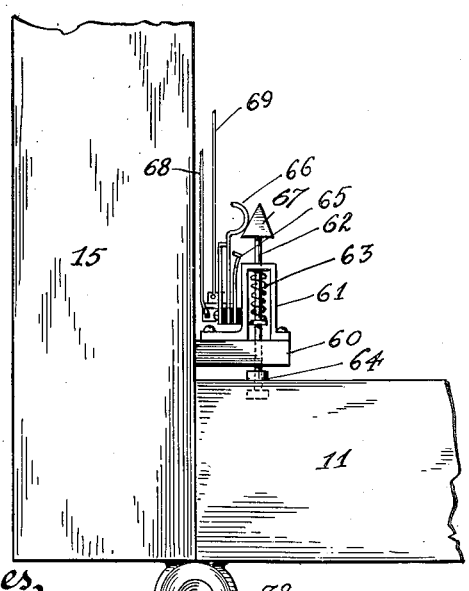
Figure 4:
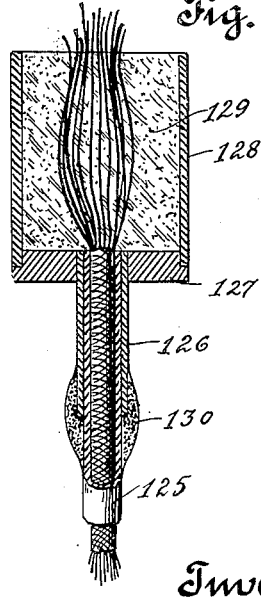
Figure 9:
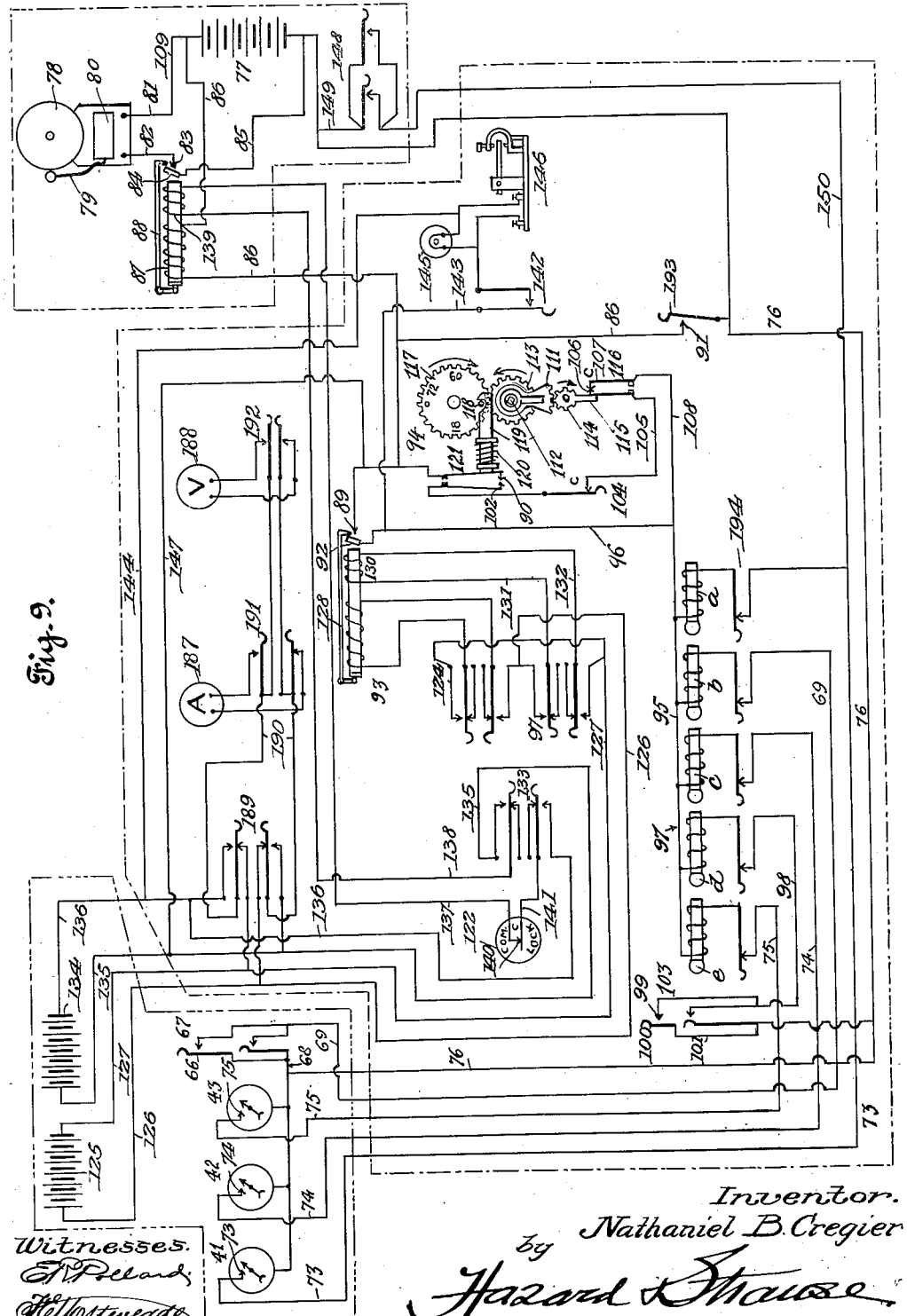

In the drawings accompanying this specification and forming therewith the application for Letters Patent: Figure 1 is a perspective view of a safe provided with double doors, showing the preferred interior arrangement, portions of the structure being shown in section, together with the control and gong stations. Fig. 2 is an enlarged view showing the distributing pipe, together with the gages and pump connected therewith, the portions of the electrical connections being shown in diagrammatic view. Fig. 3 is an enlarged detail of the door closing switch, showing the latter with the circuit open, the door being closed. Fig. 4 is a sectional detail of the method of closing the terminal ends of the vacuum pipe carrying the electrical conductors to the control and gong stations. Fig. 5 is a sectional detail through the upper corner and a portion of the side walls of the vault. Fig. 6 is a sectional detail of the top of the vault showing a portion of the adjoining walls in elevation previous to the insertion of the filling. Fig. 7 is a detail plan view showing the method of constructing the floor, parts being broken away to clearly show the different layers of material forming the floor. Fig. 8 is a transverse cross section through the floor and a small portion of one of the side walls showing the method of carrying the tube through the floor into the side walls. Fig. 9 is a diagram of the connections for the protector, the dotted lines segregating the connections inclosed in the vault control station and gong station, respectively.

More specifically in the drawings, numerals are used to indicate the same parts in the different views, 10 designating the floor of a vault provided with the doors 11 and 12, and side walls 14 and 15, together with the rear wall 16, the whole being closed by the top 17. In the construction of the vault walls, component sides and ends are preferably constructed as one or more separate elements formed on a frame of a general rectangular form constructed of angle irons 18. Next in contact with the inner faces of the angle irons a metal plate of sheet steel is secured in any well known manner, as rivets, or brazed to the angle irons forming the frame.

In the construction of the floor, I-beams 20 are now transversely placed in the panel, these being spaced in regular intervals by means of the spacing blocks 21 to which the flanges of the I-beams are preferably secured by means of the screws or other suitable fastenings 22. At the corners these blocks are extended, as shown at 23, to form corner braces so that the angle irons are more securely held in proper position to sustain the often heavy loads carried thereby. In the floor panel a metal plate 24 is preferably placed to form the floor of the vault or safe structure, but previous to the insertion of this latter plate the vacuum pipes 25 are necessarily placed in position.

As clearly shown in the figures, the webs of the I-beams are slotted or provided with suitable bores near their ends, through which the pipes 25 are carried, one length of pipe being included between each pair of I-beams and curved at the ends to extend through the slot or bore in the flange. These pipes are carried close to the lower portion of the I-beams and preferably close to the asbestos sheet 26 placed next to the exterior metal plate 19. The pipes 25 are preferably lifted from their dependent position at the ends along their parallel portions so that their position is practically intermediate of the two metal plates and the space formed between these metal plates is filled with cement 27 or other suitable aggregate material of a non-inflammable and impervious nature. The metal floor 24 is now laid and the structure is ready for assembling of the side walls, which are of somewhat different construction, the exterior plate and the angle irons being the same, together with the asbestos plate 26, these latter being preferably held in position by the heavy screen wire 28 suitably secured in the flanges at the sides and ends of the panel. Preferably intermediate of said angle bars composing the upright panels, a strap 29 provided with securing flanges 30 is fastened to the upper and lower flanges of the angle bars, this strap being provided with notches at suitable intervals oppositely disposed or staggered, in which the pipes 25 of the panel are wound to and fro. To brace this strap one or more horizontally disposed straps 31 are carried across provided with suitable flanges at the engaging ends of the angle irons to be secured thereto, the vertical strap 29 being preferably turned, as shown, to provide for the fastenings 32 to secure the strap 31 thereto. After the pipes 25 have been placed in position to further strengthen those portions parallel with the strap 31 small flanged sleeves 33 are provided, which embrace the pipe and are secured to the strap 31 by means of fastenings 34. To further strengthen and provide more solid support for the concrete to be introduced a second section of screen wire 35 is carried between the pipes so that it falls intermediate of the latter, affording further reinforcement. The panels being preferably built in a horizontal position cement is now introduced so that the inclosed space of the angle irons is filled with concrete the same as for the floor, it sometimes being found necessary to include the plate 36 as high as the usual wainscoting in building constructions. The panel forming the top is similarly constructed as the side panel, with the exception that a final heavy screen wire 37 is preferably placed in position just below the surfaces of the cement so that the latter is securely held in position at this point.

Suitable binding wires are passed around the straps to hold the pipe 25 in position so that the latter are not displaced during the placing of the cement around the same. Suitable connections, usually sleeves 49 soldered at their junctions with the pipe, are used to join the free ends of the pipe where they are registered to form a continuous line through the different sections or panels composing the completed structure. The doors are similarly formed and provided with the hinges 38 on which they are hung to the side walls, a flexible connection 39 being provided to connect up the vacuum pipes carried in the door to the length of the pipe carried in the adjoining panel.

Within the vault chamber is located a suitable shelf 40 supporting the three vacuum gages 41, 42 and 43, connected by suitable connections to the distributing pipe 44 shown as supported under the shelf, suitable valves 45 being interposed in the path of the connections to each of the respective gage. From the distributing pipe 44 the pipe 46 is carried preferably in the back wall and floor panels to the valve 47 located in a convenient position on the floor provided with a nipple to which any suitable air pump 48 may be attached, that shown being a hand operated pump of the common type. Also placed within the vault on the shelf 40 are the primary or secondary cells forming the electric batteries 125 and 134 to operate the electrical devices connected with the protecting mechanism. The centrally disposed vacuum gage 42 is preferably connected to the open end of the protecting pipes 25 carried through the various panels composing the vault and the door or doors, closed at its oppositely disposed end, the gage 41 being connected with an independent vacuum line 50 of any desired length, which communicates with and ends inside the gong station 55, which is usually placed exterior of the building, or in any conspicuous place on the building, the gage 43 being connected to a similar vacuum line 54 connected to a control box 56 which is also independently located and preferably in some portion of the building near the vault. A suitable cable 57 is carried in the pipe 50 and a similar cable 58 is carried in the line 54, the various connections afforded by these cables being described hereafter in connection with the diagram shown in Fig. 9. The cable itself may also form the vacuum line as a lead or metal covered cable may be readily exhausted to provide a vacuum.

Where the cable itself is used for the vacuum line as shown in Fig. 4 and provided with the usual lead casing 125, this lead casing is preferably carried through the sleeve 126 in the annularly flanged plate 127 provided with a cylindrical casing 128 forming a cup through which the lead covering does not extend. The various conductors are preferably separated in this chamber so that a filling compound 129 poured into the cup will entirely close the interstices and effectually form an air seal. To further insure a tight joint, casing 125 and the sleeve 126 will preferably be securely sealed by the wiped joint 130.

Adjacent the door 11 on the side wall to which the latter is hinged is mounted a suitable bracket 60 carrying the yoke 61 on which is slidably mounted a jack with its stem 62 operated by means of the spring 63, which normally presses the head 64 outward when the door 11 is opened. Secured to the yoke 61 are a series of spring contacts 65 and 66 of an alarm switch 67, these contacts being in electrical connection with the line wires 68 and 69, respectively, so that the spring contact 66 will be thrown into connection with the contact 65 to close the circuit when the door is open, and open the circuit when the door is closed and locked. The line 68 is connected directly or forms a portion of the bus-bar from which connections are carried to each of the vacuum gage cases of the respective gages 41, 42 and 43. At the proper point on the gages adjustable contact points 73', 74', and 75' are mounted in an insulating bushing, which points are adapted to be contacted by the gage pointers to close circuits between the bus-bar line 68 and conductors 73, 74 and 75 of which the correspondingly numbered contact points are a part. This connection is effected when the vacuum in the pipe-lines is reduced below a predetermined point.

Connected into the bus-bar 68 is the conductor 76 which leads to one side of the battery 77 arranged in the gong-station 55, which battery supplies the current by which the gong 78 is sounded by means of the common electrically operated vibrating hammer 79 by means of the magnet 80; which battery 77 also supplies the current by which the mechanism for controlling the gong-circuit is operated. The gong-circuit comprises a conductor 81 connecting with one terminal of the battery 77 and one terminal of the magnet 80 and a conductor 82 leading from the other terminal of the magnet 80 to a contact member 83 adapted to be electrically connected with a normally open switch member 84 on a conductor 85 connecting with the other terminal of the battery 77. The gong-circuit designated as 109 is designed to be closed to sound an alarm when the vacuum is reduced in either of the pipe-lines 25, 50 and 54 and also through the operation of the contacts 65 and 66 in event the vault doors are wrongfully opened and is further subjected to operation through other alarm switch mechanisms, all of which control the switch member 84 of the alarm circuit, as will be later described.

Leading from the terminal of the battery 77 opposite the terminal connecting with the conductor 76 is a conductor 86 which is wound to form a magnet coil 87 controlling the closing of the switch contact 84 through a trip armature 88; the conductor 86 leading from the coil 87 connecting with a series of contact members 89, 90 and 91. The contact member 89 is adapted to be connected with a switch contact 92 on the energizing of a magnet 93, as will be later described, and the contact 90 is controlled by a clock mechanism 94. The switch contact 92 is connected to a bus-bar 95 through a conductor 96, which bus-bar connects with a series of annunciator drops 97 here shown as five in number and indicated at —a— —b— —c— —d— and —e— contained in the control box, which are thus arranged on the circuit of the battery 77. The bus-bar 95 is connected through the annunciators —a— —c— and —e— to the conductors 73, 74 and 75, respectively, leading from the gages 41, 42 and 43 so that when a circuit is completed from the battery 77 through the conductors 86, 96 (or clock controlled circuit 94 to be presently described) bus-bar 95 and any one of the conductors 73, 74 and 75 according to which of the gages 41, 42 and 43 is operated by a decrease in vacuum in the pipe-line controlled thereby to close circuit with the conductor 76 the corresponding annunciator will be operated to indicate which pipe-line has been affected. The annunciator —b— connects with the conductor 69 leading to the contact member 65 controlled by the vault door, which, when improperly opened, will complete a circuit from the battery 77 through the contact members 65 and 66, conductors 69, and annunciator —b— when the bus-bar 95 is electrically connected to the conductor 86 either through the contacts 89 and 91 or the connections controlled by the clock 94; the return circuit being effected through the conductor 76. The annunciator —d— is connected through a conductor 98 to a contact member 99 normally out of connection with a spring contact member 100 on a conductor 101 leading to the conductor 76; the contact members 99 and 100 forming a switch 103 corresponding to the switch 67, and which switch 103 is controlled by the door 56' of the control box 56 and will operate when the door 56' is wrongfully opened to close the alarm circuit through the annunciator —d—. Similarly, any number of alarm switches may be connected through annunciators between the bus-bar 95 and the return conductor 76.

Arranged within the control box 56 is the time control or clock mechanism 94 which may be of any suitable construction and is provided for the purpose of automatically maintaining the connection between the battery 77 and the bus-bar 95 closed during predetermined periods of time such as the interval between the closing and the opening of the vaults, and for automatically opening the connection at a predetermined time and maintaining it open for a suitable length of time, and performs two functions, one of which is to place the system in and out of service automatically at a given time and to guard against the system being taken out of service before the desired time. This clock mechanism operates on the contact member 90 which is adapted to be moved in and out of connection with the contact member 102 on a conductor which connects through a normally closed clock cut-out switch 104 connecting with a conductor 105 leading to a spring contact member 106 normally in electrical connection with a contact member 107 on a conductor 108 connecting with the bus-bar 95.

The contact members 90 and 102 are designed to be closed; likewise the switch 104 and the contact members 106 and 107 when the vault doors are closed, during which time the contact members 89 and 92 are disconnected so that current can flow from the battery 77 through conductors 86, 105 and 108, bus-bar 95 and back to the battery 77, through the return conductor 76 in event any of the circuit closers or alarm switches are closed, such as would be occasioned by puncturing any of the vacuum tubes 25, 50 and 54, or operating the switches 67 or 103 so that the magnet 87 will be energized to close the alarm circuit 109 through the switch contact members 83 and 84 to sound the alarm.

The clock mechanism is so constructed as to open the circuit of the battery 77 at the contacts 90 and 102 at a predetermined time at which time the vault doors may be opened without sounding the gong 78. The construction and functions of the clock mechanism are as follows: After the vault doors are closed the clock is wound to run for the desired number of hours elapsing before the vault doors are to be again opened. In winding the clock the wheels are moved as indicated by the arrows in Fig. 9; the wheel 113 being positively mounted on the key shaft 112, while the pinion 111 is frictionally mounted thereon and is provided with a short arc of teeth, which mesh with a pinion 114 carrying an arm 115 for operating the spring switch member 106. Winding the clock through the stem 112 turns the wheels in the direction indicated by the arrows, which throws the arm 115 out and away from the spring contact 106 of the switch 116, which is normally open, unless closed by the arm 115; winding thus being continued so that the hour wheel 117 will be turned clockwise until the desired number of hours has been reached. Here the movement of the clock mechanism is effected by the springs and escapement of the ordinary clock work, not necessary to be here shown, which will then operate to reverse the direction of the clock wheel 117. In winding the clock a pin 118 on the hour wheel 117 is carried out of engagement with a notch formed on the reciprocating rod 119 normally under the pressure of a spring 120 which operates to normally maintain the contact members 90 and 102 in connection with each other when the pin 118 is disengaged from the bar 119. The clock being then set in motion and the direction of movement of the wheel reversed, the frictionally mounted pinion 111 in the proper interval of time, usually about fifteen minutes, restores the switch 116 comprising the contacts 106 and 107, to its closed position through the medium of the arm 115. This interval of time before the closing of the switch 116 is provided to allow for the proper arrangement of the system by the watchman or operator in closing the system or making the tests in the lower compartment of the control station 56, as later described, without danger of setting off the alarm.

The rod 119 engages the switch arm 121 carrying the contact member 90 and holds the latter in closed connection with the contact 102 until the pin 118 returning in a counter clock-wise direction engages the notch in the rod 119 and shifts the latter and the switch arm 121 to break the connection between the contacts 90 and 102 at the termination of the allotted time, whereupon the doors of the vault may be unlocked and opened without sounding the gong. It will now be seen that on the lapse of about one-quarter of an hour's duration after the clock has been wound there will be an electrical connection between the conductor 86 and the bus-bar 95 through the contacts 90, 102, switch 104, conductor 105, switch 116 and conductor 108, and that after this connection has been made and the door 56' of the control box 56 closed it is impossible to open the vault doors or that of the control box without sounding an alarm until after the clock has run down and the reciprocating pin 119 is engaged by the pin 118 and pulled to the right sufficiently far to open the circuit at 121. The switch 104 is provided for the purpose of cutting out the circuit from the battery 77 as controlled by the clock mechanism 94 and is used in case the clock is out of order. The switches 104, 116, 121 and 92 are arranged in the upper portion of the control box 56 within the chamber closed by the door 56', which door is fitted with a combination lock 122 and adapted to so position the switch 103 when it is closed that it can not be opened without sounding an alarm until the clock mechanism operates the switch member 121, as before described.

The control box 56 is provided with a separate lower compartment fitted with a door 123, which may be opened without causing an alarm, to give access to a series of controlling keys and testing mechanisms. Included in this control mechanism is a means for throwing the switch member 92 in and out of connection with the contact 89 so that the bus-bar 95 may be electrically connected to the circuit of the battery 77 independent of the clock mechanism 94 by which arrangement the system may be thrown on without waiting for the clock to bring it on automatically. This is accomplished by means of a key 124 for controlling a flow of current from a battery 125 through conductors 126 and 127 to the magnet coil 93; the key 124 being normally disposed in an open position and operating when closed to direct current from the battery 125 through the coil 93, whereby a trip armature 128 will be operated to release the switch contact 92 and allow it to move into connection with the contact 89. A key 129 is also provided by which the switch contact 92 may be restored to its open position by directing current through a magnet winding 130 from the conductors 126 and 127 from the battery 125 through the conductors 131 and 132; the key 129 being normally positioned to open the circuit of the magnet 130 and is provided for the purpose of closing the circuit to open the switch member 92 when it is desired to have the system operated through the clock control. Means are also provided in the lower portion of the control box by which the switch contact 84 of the gong-circuit can be opened to cut out the gong in event the latter has been thrown in. This means includes a key 133 for controlling the flow of current from a battery 134 through conductors 135 and 136 leading from the opposite terminals of the battery 134 to the key 133, which key is normally opened, but when closed serves to direct current from the conductors 135 and 136 through conductors 137 and 138 to a magnet coil 139, which, when energized, will move the switch member 84 to its normal position in engagement with the trip armature 88.

As a means for preventing the cutting off of the gong merely by the operation of the key 133, which could be accomplished by the opening of the door 123, the circuit of the magnet 139 is through the combination lock 122 which is so constructed and connected to the conductor 137 that when the combination lock is in a set or locked condition a pair of contacts 140 and 141 on the conductor 137 will be separated; these contacts 140 and 141 being connected when the combination lock is in its unlocked position. This necessitates operating the combination lock 122 to open the door 56' before the circuit of the magnet 139 can be completed by operating the key 133.

As there are no indications by which an official desiring to open the vault can determine whether it is under control of the clock mechanism or not it is advantageous to provide a means whereby he may ascertain this fact, for, in event the system is not under the clock control he may cut out the system by operating the cut-off key 129, thereby permitting him to open the safe at any hour. To enable the operator to determine this point a test device is provided which includes a normally open switch 142 arranged in the lower part of the control box 56. One terminal of the switch 142 connects with a conductor 143 connecting with the conductor 96, the other terminal of which switch connects with a conductor 144 on which a lamp 145 and of sounder 146 are mounted in parallel; the conductor 144 connecting with the conductor 136 leading from one terminal of the battery 134. A conductor 147 connects with the conductor 135 leading from the other terminal of the battery 134 and connects with the conductor 86 leading to the contact members 89 and 90. If the switch 92 and contact 89 are open and the clock control is in connection, closing of the switch 142 will cause a current to flow from the battery 134 to the lamp 145 and the sounder 146 thus forming a light at the lamp to give a visual signal and operating the sounder to give an audible signal, thereby indicating that the clock controlled circuit is complete; the circuit from the battery 134 being then through the conductors 135, 147 and 86, contacts 102 and 90, switch 104, conductor 105, switch 116, conductors 108, 96 and 143, switch 142, conductor 144, through the lamp 145 and sounder 146 back to the battery 134. In event the clock controlled line is disconnected either at the contacts 90 and 102, or the switches 104 and 116, this test circuit would be broken (assuming that the switch 92 is open) so that no visual or audible signal would result from depressing the switch 142. The official could then open the vault doors without sounding an alarm. In event the switch 92 is closed to contact 89 a circuit would be completed through the test circuit from the battery 134 therethrough and indicate that the alarm system was in a connected condition. The operator could then, by operating the key 129 controlling the magnet 130, break both the test circuit and the alarm system circuit, whereupon the vault doors could be opened without sounding an alarm.

The door to the gong box 55 is provided with a switch 148 corresponding to the switch 67 and 103, which connects with one terminal of the battery 77 through a conductor 149 and also with a conductor 150 connecting with the bus-bar 95 through the annunciator —a—; this switch being normally open when the door to the gong case is closed, and automatically closed when the door is opened so as to direct current from the battery 77 through the coil 87 to close the gong circuit.

As a means for enabling the testing of the currents from the batteries 125 and 134, an ammeter 187 and a voltmeter 188 are provided in the control box 56 to which current may be directed from either the battery 125 or 134 through a double switch 189, which switch is adapted to direct the current from either the conductors 126 and 127 or the conductors 135 and 136 to a pair of conductors 190; switches 191 and 192 being provided to connect the conductors 190 to the ammeter 187 and voltmeter 188, respectively.

For emergency purposes, as in case of a daylight hold-up, a switch 193 is provided on the conductor 76, which switch is adapted to be connected with the contact 91 to direct current from the battery 77 through the conductor 76 and 86 to energize the magnet 87 to throw in an alarm; this switch being so arranged that it may be closed by a cashier or bank official and throw in the alarm regardless of whether the system is on or off.

The operation of the invention is apparent from the foregoing; the vacuum system comprising the coils 25 embedded in the vault walls and the cable conducting pipes 50 and 54 leading to the gong station and control box serving to prevent entrance being made to the vault through its walls, or the cables being severed, without sounding an alarm and operating an annunciator to indicate the portion of the vacuum system affected. Thus, in attempting to sever the pipe 50 leading to the gong station reduction of vacuum in the system by the inrush of air will operate on the gage 41 in such manner as to close the circuit from the battery 77 through the gage 41 and thereby energize the coil 87 to throw in the alarm circuit, which circuit, being arranged in the gong station, will continue to sound the gong in event the cable leading to the gong station be severed. Furthermore, any attempts to open the vault doors by unlocking the same during the period when the clock controlled mechanism is in connection, or when the system circuit is connected through the contacts 89 and 92, would result in closing the circuit from the battery 77 through the switch 67, thus affecting the closing of the gong circuit. Likewise, opening of the door 56' of the control box or the door of the gong station will operate through the switches 103 and 148 respectively to close the circuit from the battery 77 to sound the alarm. It will be noted that all of the alarm controlled mechanism, except the emergency control switch 193, operate through the annunciators 97 to indicate the point at which the alarm was operated. As a means for cutting out any one of the signal circuits without affecting the remainder of the system, a series of keys or blocks 194 are provided, which blocks are arranged in the conductors leading from the annunciators 97.

What I claim is:

1. In a vault having top, bottom and side walls and hinged doors on one side thereof, a continuous pipe line rove throughout said walls and doors and embedded therein, means for creating a vacuum in said pipe line, a gage in the vault for indicating the amount of vacuum in the pipe line, a normally open electrical alarm signal circuit, a magnet adapted to close said alarm circuit, means operable by the increase in pressure in the pipe line, whereby said magnet is energized to close the alarm circuit and sound the gong, comprising contact members arranged in the gage, conductors leading from said gage to a battery and through the magnet, an annunciator operable by the closing of the circuit at the gage, a pipe line incasing said conductors connected with the vacuum creating means, a gage on said last named pipe line, and electrical connections controlled by said gage operating on the reduction of pressure in said last named pipe line, whereby the magnet will be operated to sound the alarm.

2. In a vault protector, the combination with a vault, of a vacuum line comprising a pipe rove throughout the inclosing walls of the vault and embedded therein, a manifold to which said pipe is connected, a gage on said pipe, a gong station, an electrical gong, a normally open battery circuit controlling said alarm, a normally open circuit leading from said battery having terminals in said gage adapted to be connected on the increase in pressure within the pipe line to complete a circuit from said battery, a magnet on said circuit for throwing in the alarm circuit on energizing of the magnet, means connected with the manifold for creating a vacuum in the pipe line, a second pipe line incasing the conductors leading to the alarm station and connected to said manifold, a gage on said last named pipe line, and electrical connections between said gage and the magnet, whereby the breaking of the vacuum in said last named pipe line will operate to throw in the alarm circuit.

3. In a vault protector, the combination with a vault, of a vacuum line comprising a pipe rove throughout the inclosing walls of the vault and embedded therein, a manifold to which said pipe connects, a gage on said pipe, a gong station, an electrical gong, a normally open battery circuit controlling said gong, a normally open circuit leading from said battery having terminals in said gage adapted to be connected on the reduction of the vacuum within the pipe line to complete a circuit from said battery, a magnet on said circuit for throwing in the alarm circuit on energizing of the magnet, means connected with the manifold for creating a vacuum in the pipe line, a second pipe line incasing the conductors leading to the alarm station and connected to said manifold, a gage on said last named pipe lines, electrical connections between said gage and the magnet, whereby the breaking of the vacuum in said last named pipe line will operate to throw in the alarm circuit, an electrical switch controlled by the vault doors adapted to direct current through the magnet when the vault doors are opened to throw in the alarm circuit, a control station mechanism in said station for controlling the current flow to the magnet, a pipe incasing the conductors leading to and from said station and connecting with the manifold, and means whereby breaking of the vacuum in the last named conductor will operate to sound the alarm.

In witness that I claim the foregoing I have hereunto subscribed my name this 23rd day of December, 1912.

NATHANIEL B. CREGIER.

Witnesses:
W. P. KEENE,
M. BATTEY.